United States Patent [19]

Kawamura et al.

[11] Patent Number: 4,685,789
[45] Date of Patent: Aug. 11, 1987

[54] CAMERA

[75] Inventors: Masaharu Kawamura; Yoshihito Harada; Ryuichi Kobayashi; Masayoshi Kiuchi, all of Kanagawa; Kenichiro Amano, Tokyo, all of Japan

[73] Assignee: Canon Kabushiki Kaisha

[21] Appl. No.: 855,799

[22] Filed: Apr. 24, 1986

[30] Foreign Application Priority Data

Apr. 26, 1985 [JP] Japan ................................. 60-90117
Apr. 26, 1985 [JP] Japan ................................. 60-90118

[51] Int. Cl.[4] ............................................. G03B 1/12
[52] U.S. Cl. ............................................. 354/173.11
[58] Field of Search ...................... 354/173.1, 173.11

[56] References Cited

U.S. PATENT DOCUMENTS 4,458,996 7/1984 Harigaya et al. .......... 354/173.11 X
4,579,435 4/1986 Haraguchi ........................ 354/173.1

Primary Examiner—Michael L. Gellner
Attorney, Agent, or Firm—Toren, McGeady & Associates

[57] ABSTRACT

Disclosed are a technique that in the film feeding control of a camera, before the film is wound up, when the voltage of a battery circuit for supplying voltage to the camera is above a voltage level high enough to wind-up the film, a film winding operation is initiated, and, if this winding-up operation does not terminate normally, that the film has ended is determined and the film is rewound, and another technique that when the above-described voltage level is detected, a motor for the rewinding is used as the load of detecting the voltage level of the above-described battery circuit.

9 Claims, 12 Drawing Figures

CAMERA

BACKGROUND OF THE INVENTION

1. Field of the Invention

This invention relates to cameras, and more particularly to the automatic rewinding of film and the detection of the voltage of an electrical power source.

2. Description of the Prior Art

In the conventional camera, as the film exposure has completed, when to wind up the film, if the film is not wound up by one frame by a motor for film winding up despite the control circuit is producing the drive signal for winding up film in a state that the film winding up is not completed, the state for performing the film winding up is automatically changed over to a state for performing rewinding of the film. Many cameras having such a so-called auto-U-turn capability are known. However, in the case where despite the drive signal for winding up the film is being produced, the motor for film winding up does not rotate, the unequivocal performance of the auto-U-turn produces the following drawback. That is, even in a situation that despite the film is not photographed to a prescribed number of frames, because the capacitance of the electrical power source or battery is insufficient, the motor for winding up stops on the way to wind up the film, the auto-U-turn takes place. Such a drawback has been produced.

To eliminate such a drawback, a method may be considered that when the motor for film winding up has stopped, the voltage of the battery is detected, and only when said voltage has been above a prescribed value, the auto-U-turn is caused to take place, and that if it does not reach the prescribed value, the auto-U-turn is hindered. However, when the motor for film winding up has stopped, because a so-called rush current corresponding to the internal resistance of the coil of the motor flows thereto, a large load is added to the battery, and the voltage drops. It takes a long time to recover the battery voltage. Therefore, even in a state that the capacity of the battery sufficiently exists, there is an occasion that the voltage is lowered to the neighborhood of the above-described prescribed voltage. In order to accurately discriminate the state of the electrical power source or battery, a voltage setting having a margin to some extent must be made. Or otherwise, in practice, even for a battery whose capacity is left sufficiently to be usable, it would be unavoidable to discriminate it as no longer usable. Also, it may be considered to wait a time for recording the battery. But the elongation of the control response time is unconvenient to the user and it has sometimes been mistaken for damage.

Also, meanwhile, in U.S. Pat. No. 4,458,996, a control circuit of camera is disclosed that after the film has been exposed, and a shutter closing signal is produced, whether or not the battery of the electrical power source is sufficiently present is detected, and if so the motor for winding up the film is driven. In the camera disclosed in such publication, nothing is disclosed about the auto-U-turn that in the film winding up state, when the film is not wound up by one frame by the film windup motor despite a signal for winding up the film is being produced from the control circuit, the film is automatically rewound.

Next, in the above-described detection of the electrical power source or battery, in general, the cameras have dry batteries as the electrical power source. In order to detect that the capacity of such an electrical power source is sufficient, the internal resistance of the battery must be taken into account. So it is nonsense to do detection without connecting a load to the battery. Therefore, there was need to connect the load to the battery when the battery voltage is detected. A first method of detecting the battery voltage with the load connected to the battery was to provide a load resistor solely usable for battery voltage detection within the camera. A second method was to use a magnet for performing the photographic operation of the camera, for example, the aperture control or shutter control commonly as a load for battery voltage detection.

By the way, in the recent cameras, there are increasing occasions that not only the electromagnet is used for controlling the diaphragm or shutter, but also a motor is used for winding up the film or charging the the diaphragm and the shutter. So, as the electrical power source, not a battery of small size such as mercury battery as in the past, but a relatively large size battery, for example, AA type battery is used. Therefore, in the recent cameras, in order to detect whether or not the capacity of the electrical power source is sufficient, a load of large power capacity becomes necessary. To employ the above-described first method, it is required that the solely used load resistor be made a resistor of large power capacity. Not only this causes the cost to rise, but also, because such a resistor becomes a resistor of large size, it is near the impossibility to find a space for its installation in such an instrument of small size as the camera.

Also, in the case when the above-described second method was employed, because it leads to actually supply current to the magnet for performing the photographic operation of the camera, there was need to provide an additional mechanical member for inhibiting the release of, for example, a latch for the shutter so that even when the magnet for performing the operation of the shutter was energized for the purpose of detecting the battery voltage, the shutter did not open.

By the way, in the conventional cameras, as the magnet for performing the photographic operation of the camera, use aas made of the so-called current hold type magnet in which the armature was attracted during the time when current was supplied thereto, and was released when the current supply was cut off. So, there was provided a member for mechanically holding the armature when such a magnet was not energized. Therefore, in the camera using the conventional current hold type magnet, the above-described second method could readily be employed.

However, because the current hold type magnet held the armature by attraction so long as the current was supplied thereto, there was a drawback that when such a magnet of the current hold type was used for controlling, for example, the running down of the trailing curtain of the shutter, as the shutter time was set to a long value, for example, 10 seconds, the consumption of electrical energy necessary to energize the magnet for so long a time was large.

Therefore, in the recent cameras, a combination type of magnet with a permanent magnet incorporated in the solenoid is finding increasing use.

Such a magnet holds the armature by the attraction of the permanent magnet when the solenoid is not energized. By supplying current to the solenoid, as the magnetic flux of the permanent magnet is cancelled by the magnetic flux of the solenoid, the armature is released.

Therefore, an advantage of reducing the consumption of electrical energy was produced, but there was provided no member for mechanically holding the armature when the solenoid was unenergized as in the current hold type magnet.

Therefore, in the camera using many magnets of the combination type, the above-described second method could not be employed. Also, to specially provide a member of mechanically holding the armature for the purpose of detecting the battery voltage could not really be made from the point of view of the cost and space. Even if it could, there was a drawback that such a magnet was too small as the load for the battery.

As has been described above, in the recent cameras, there was a drawback that in order to detect whether or not the capacity of the electrical source was sufficient, any of the above-described first and second methods was not suitable.

SUMMARY OF THE INVENTION

A first object of the invention is to eliminate the above-described drawbacks of the conventional camera having the auto-U-turn capability. Under such an object, the present invention has a first feature that when the shutter closing operation has been carried out, whether or not the capacity of the electrical power source is sufficiently present is detected, and when that it is sufficient has been detected, and when the film is not wound up by a prescribed amount by a film windup motor, the auto-U-turn is carried out.

Further, a second object is to provide a novel device for detecting the voltage of an electrical power source which has eliminated the above-described conventional drawback when in the detection of the battery voltage. Under such an object, the present invention has another feature that a motor for use in winding up the camera, or charging the shutter and diaphragm is used as a load for detecting the voltage of the electrical power source.

Other objects of the invention still become apparent from the drawings and embodiments shown below.

DETAILED DESCRIPTION OF THE PREFERRED EMBODIMENTS

In the following, the present invention is described in detail by reference to the drawings. In embodiments to be described below, the winding up of the film, the charging of the shutter and others, and the rewinding of the film are performed by respective motors solely used therefor independently of each other, and, in order to detect whether or not the capacity of the electrical power source is sufficient, the motor for rewinding the film is used as a load for the electrical power source in such a manner that when current is supplied thereto, it rotates in the reversed direction to that in which the film is rewound.

Figure 9A:
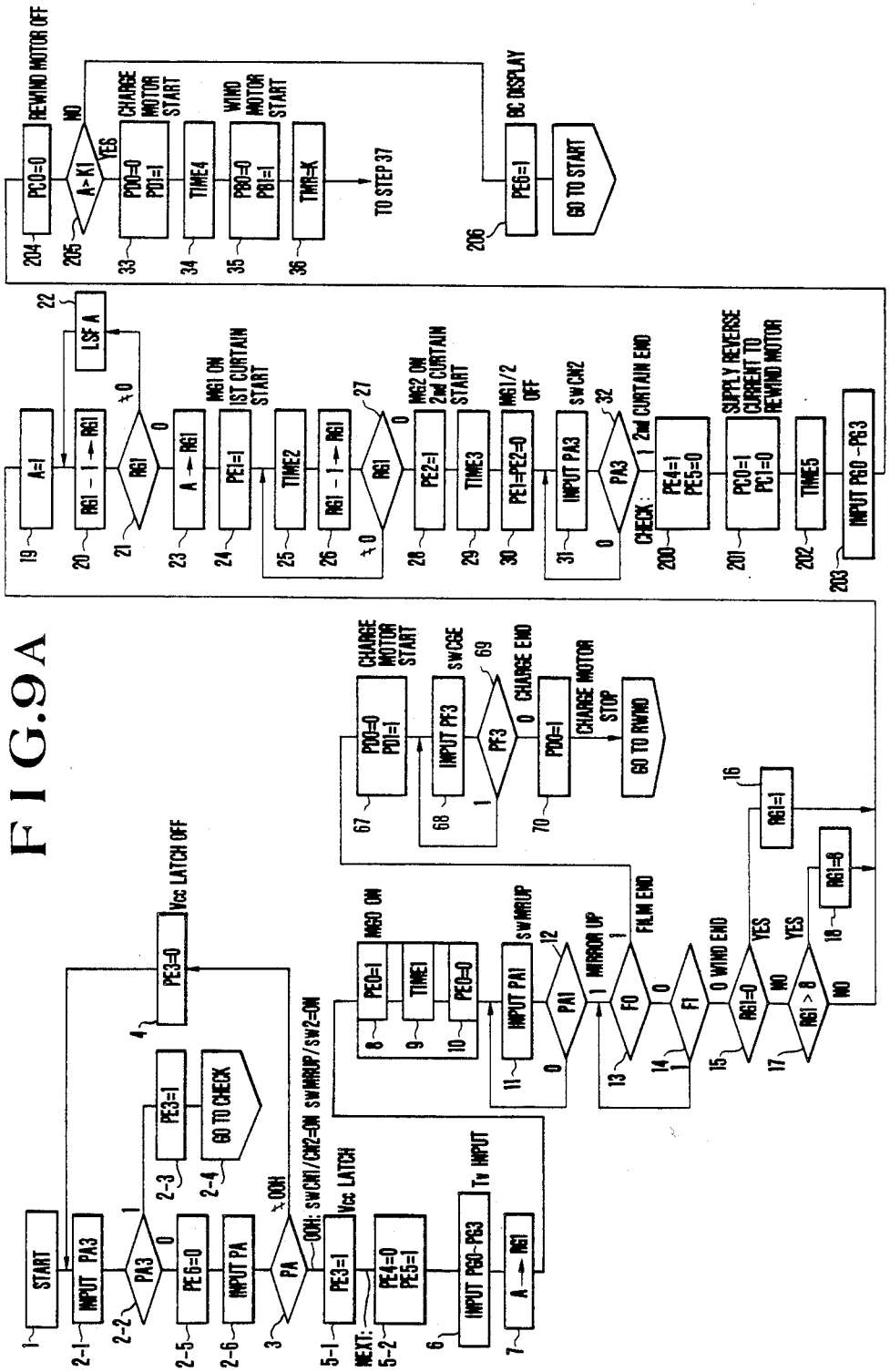
FIGS. 9A, 9B, 10 and 11 are flow charts.
Figure 9B:
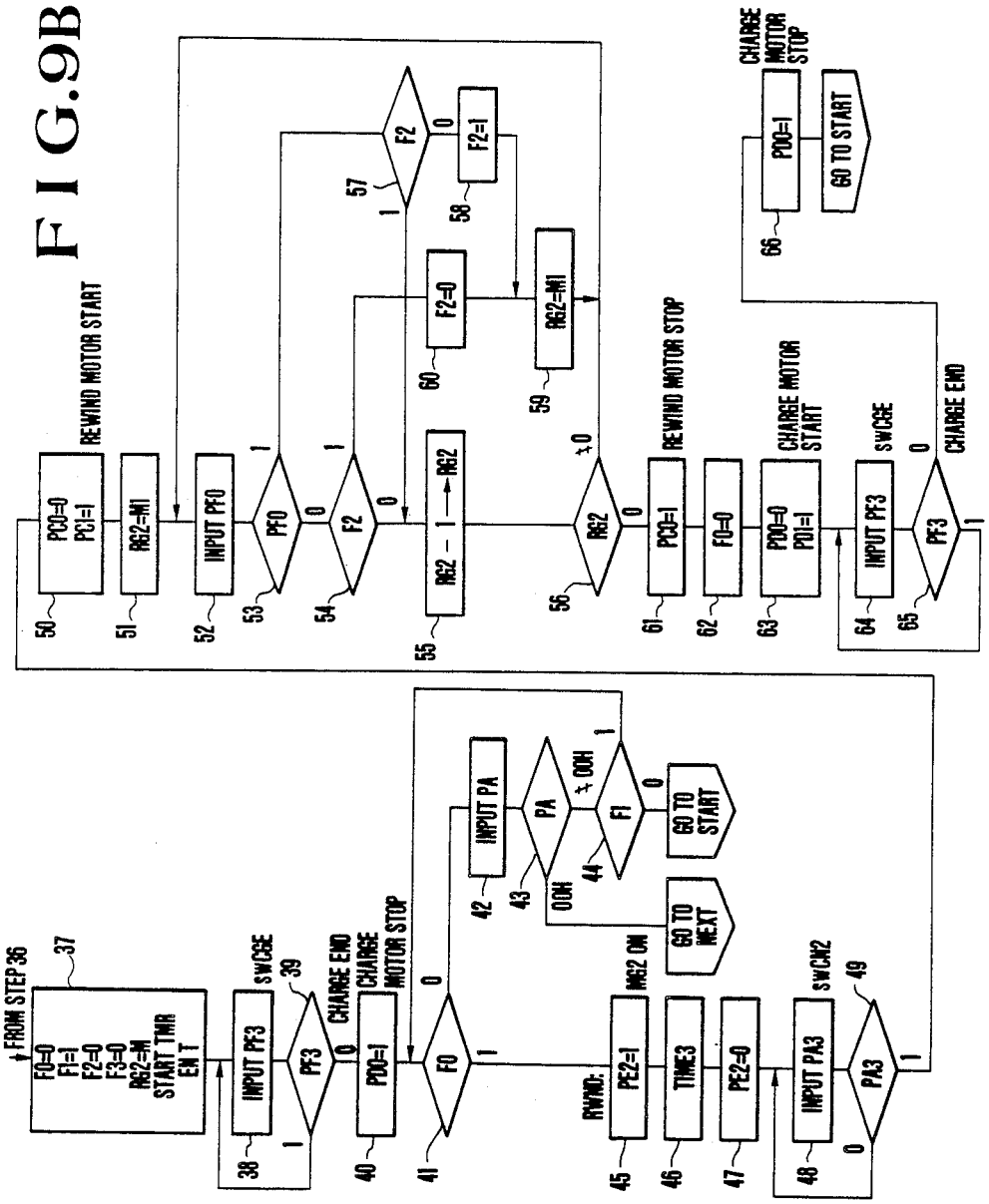

Also, the characteristic matters of the invention are disclosed in the steps 200 to 206 and the steps 34 to 51 shown in FIGS. 9A and 9B of the flow chart of the embodiments of the invention. As detecting means for detecting that the shutter closing operation has been carried out, the steps 31 and 32 correspond. As detecting means for detecting that the capacity of the electrical power source is sufficient for winding up the film by a prescribed amount, the steps 200 to 206 correspond, and as detecting means for detecting that the film is wound up by the prescribed amount, the step 44 corresponds, as control means for actuating the film rewind means when the film has not been wound up by the prescribed amount despite that the capacity of the electrical power source is sufficiently present has been detected, the steps 44 to 50 correspond.

Figure 1:
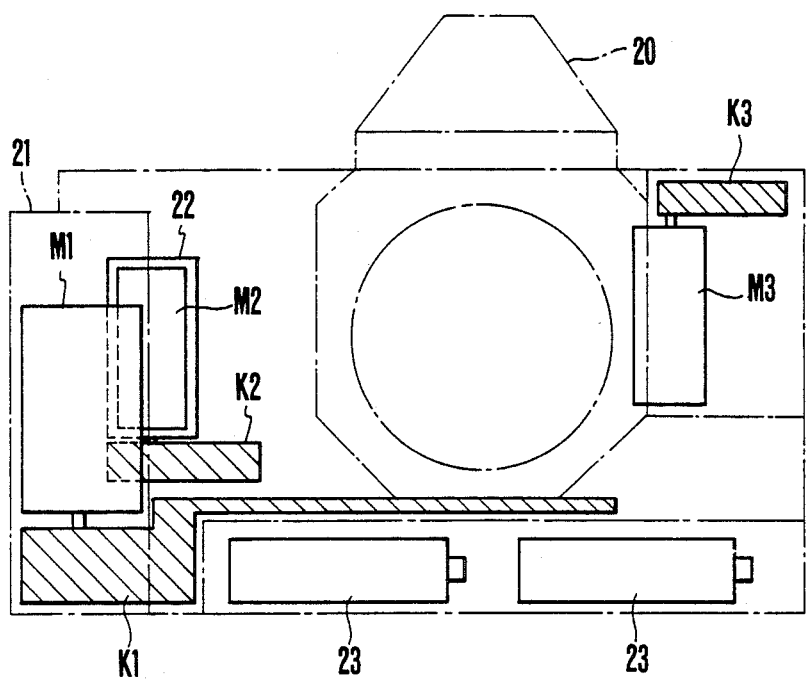
FIG. 1 is a front elevational view of an embodiment of a camera according to the invention.

FIG. 1 is a view illustrating an arrangement of individual motors as looked from the front of the camera of one embodiment of the present invention. M1 is a charge motor governing the charging of the shutter and the charging of the diaphragm adjusting mechanism, lens drive mechanism, and mirror drive mechanism, and is arranged in the left-hand end of a camera housing 20 as viewed from the front. On the charge motor M1, the load variation due to the atmospheric conditions is little, but because the absolute load is large, a relatively large motor becomes necessary. For this reason, it is accommodated in a grip 21 fromed as protruding from the front right-hand corner of the camera housing 20. K1 is a charge transmission system for the charge motor M1. A wind-up motor M2 is arranged in a spool arrangement 22 for taking up the film, and a wind-up transmission system K2 is arranged adjacent thereto. A rewind motor M3 is arranged on the right side of the camera 20 as viewed from the front, that is, adjacent the cartridge chamber, and a rewind transmission system K3 is arranged adjacent thereto. 23 is an electrical power source comprising four cylindrical batteries.

Figure 2:
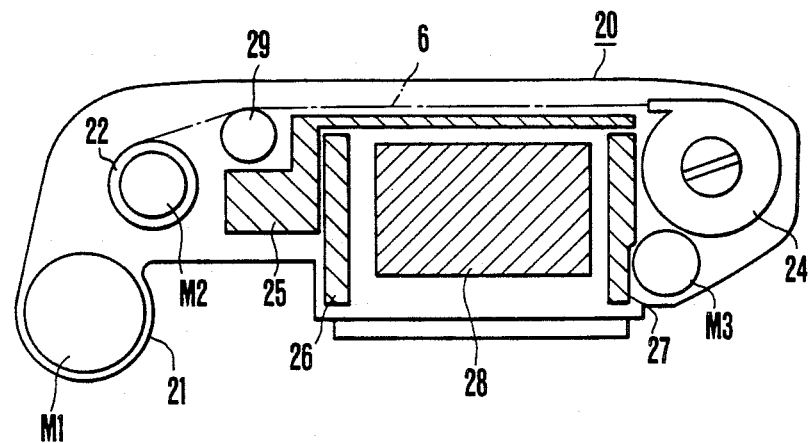
FIG. 2 is a top plan view of the same camera.

The relative positions of the above motors are clearly shown in FIG. 2 as viewed from the above of the camera 20, where the film cartridge is denoted by 24, the shutter of vertically running blade type by 25, the mirror operating mechanism by 26, the control mechanism for the diaphragm of the lens by 27, the focusing mechanism by 28, and a sprocket mechanism for indexing the advanced length of one frame of the film 6 by 29.

Figure 3:
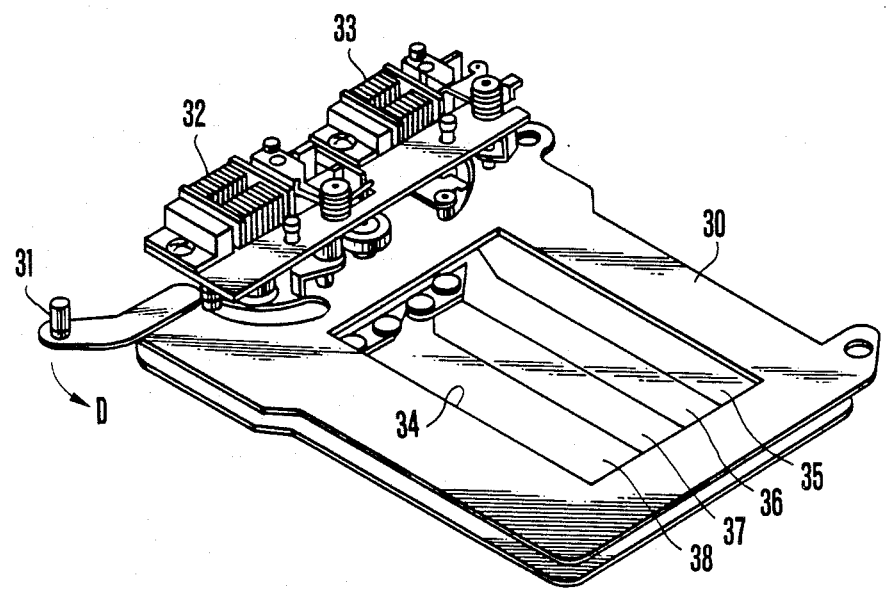
FIG. 3 is a perspective view of the shutter device.

FIG. 3 is a perspective view of the shutter 25 shown in FIG. 2. A charge lever 31 for the shutter unit 30 is moved in a direction indicated by arrow D when it is being charged by the motor M1 of FIG. 2. Current supply to leading and trailing curtain control magnet units 32 and 33 is controlled by a circuit shown in FIG. 7. When they are energized, the leading and trailing curtains of the shutter run down. An exposure aperture 34 is covered by the leading curtain alone when the shutter charging is completed. But soon after the shutter is closed by the trailing curtain, the leading curtain also is moved to cover the exposure aperture 34. Each of the leading and trailing curtains is constructed with a plurality of shutter blades of rectangular shape as shown by 35 to 38. Though there is a possibility of occurrence of slight openings between the successive two shutter blades as they are attracted by static electricity of the rubbed film or pushed by wind when the film is being transported behind the shutter, the film is hardly fogged because the exposure aperture 34 is covered by both of the leading and trailing curtains.

Figure 4:
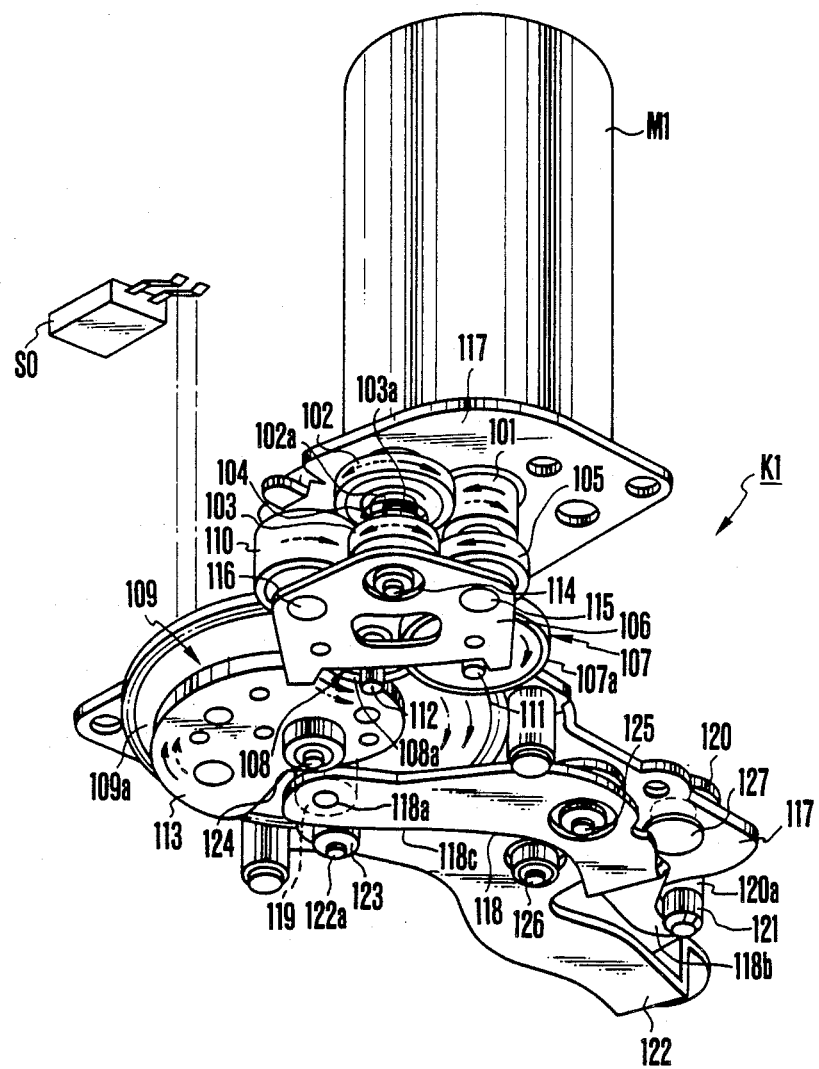
FIG. 4 is a perspective view of the charge transmission system.

In FIG. 4 there is shown the charge transmission system K1 of the charge motor M1 in detail. A pinion gear 101 on the output shaft of the motor M1 meshes with a gear 102 which constitutes a 2-stage gear together with another gear 103. The gears 102 and 103 are independently rotatably mounted on a shaft 114 fixedly mounted to a base plate 117, and have thrust projections 102a and 103a on the confronting faces thereof so that when rotated, they are unified, but when in axial directions, they are movable relative to each other. The opposite face of the gear 103 is frictionally pressed against a planetary lever 106 by a compressed spring 104 between the gears 102 and 103 so that the planetary lever 106 turns arround the shaft 114 to follow up the rotation of the gear 103. A gear 105 is rotatably mounted on a pin 115 planted to the planetary lever 106 and meshes with the gear 103. Another 2-stage gear 107 has a large gear 107a and a small gear (not shown) fixedly mounted thereon and is rotatably mounted on a pin 111 planted to the base plate 117. When the gear 103 rotates in a clockwise direction, and the gear 105 in a counterclockwise direction (indicated by arrow), the planetary lever 106 is turned in the clockwise direction, thereby the large gear 107a is brought into meshing engagement with the gear 105. A gear 108 is rotatably mounted on a pin 112 planted to the base plate 117, and comprises a large gear 108a and a small gear (not shown) formed on the upper surface of the gear 108a in fixed relation. The large gear 108a is always meshing with the small gear 107b. A gear 110 is rotatably mounted on a pin 116 planted to the planetary lever 106 and is always meshing with the gear 103. When the gear 103 rotates in the counterclockwise direction, the planetary lever 106 is turned in the clockwise direction, thereby the gear 110 is brought into meshing engagement with the large gear 108a. A cam gear 109 is rotatably mounted on a pin 124 planted to the base plate 117 and has a gear 109a and a cam disc 113. The gear 109a is always meshing with the small gear of the gear 108. Depending on the direction of rotation of the charge motor M1, the above-described transmission is changed over between high and low speed reductions, of which the former is selected when the motor M1 rotates in the counterclockwise direction so that as all the parts rotate in the respective directions indicated by solid line arrows and the planetary lever 106 turns in the clockwise direction, a gear train of the pinion 101→the gears 102 and 103→the gear 105→the gear 107 (large gear 107a and small gear 107b)→gear 108 (the large gear 108a and the small gear 108b)→the cam gear 109 is established, the speed of rotation of the cam gear 109 being slow. Conversely when the charge motor M1 rotates in the clockwise direction, as all the parts rotate in the directions indicated by dashed line arrows and the planetary lever 106 turns in the counterclockwise direction, another train of gears 101→102, 103→110→108→109 is estabilished, and the cam gear 109 rotates at a high speed. For note, the aforesaid two gear trains are so arranged that the direction of rotation of the cam gear 109 is clockwise no matter which direction the rotation of the charge motor M1 may take.

A first shutter charging lever 118 is pivotally mounted on a pin 125 planted to the base plate 117 and has a roller 119 rotatable about a pin 118a fixedly mounted on one arm end thereof, the other arm of which is formed to a cam 118b. The roller 119 rides on the outer periphery or camming surface of the cam disc 113, so that as the camming surface goes up and down, swinging movement is imparted into the first shutter charging lever 118. And, such movement causes the cam 118b also to swing. A second shutter charging lever 120 is pivotally mounted on a pin 127 planted to the base plate 117 and has a roller 121 rotatable about a pin 120a fixedly mounted thereon. The roller 121 is in contact with the cam 118b to transmit movement of the first lever 118 to the second lever 120. And, the second lever 120 controls the charging operation of the shutter mechanism (not shown).

A lever 122 for charging the known diaphragm control mechanism, mirror mechanism and focusing mechanism is pivotally mounted on a pin 126 fixedly planted to the base plate 117, and has a roller 123 rotatable about a pin 122a fixedly mounted on one arm thereof. This roller 123 is in contact with a second cam 118c of the first shutter charging lever 118. Therefore, the lever 122 turns to follow up the lever 118, thereby the diaphragm control mechanism and mirror mechanism are charged.

A switch S0 cooperates with a signal disc fixedly carried on the opposite surface of the cam gear 109 to that having the cam disc 113 to produce an output signal representing when motion of the charge motor M1 arrives at the cam 113.

Figure 5:
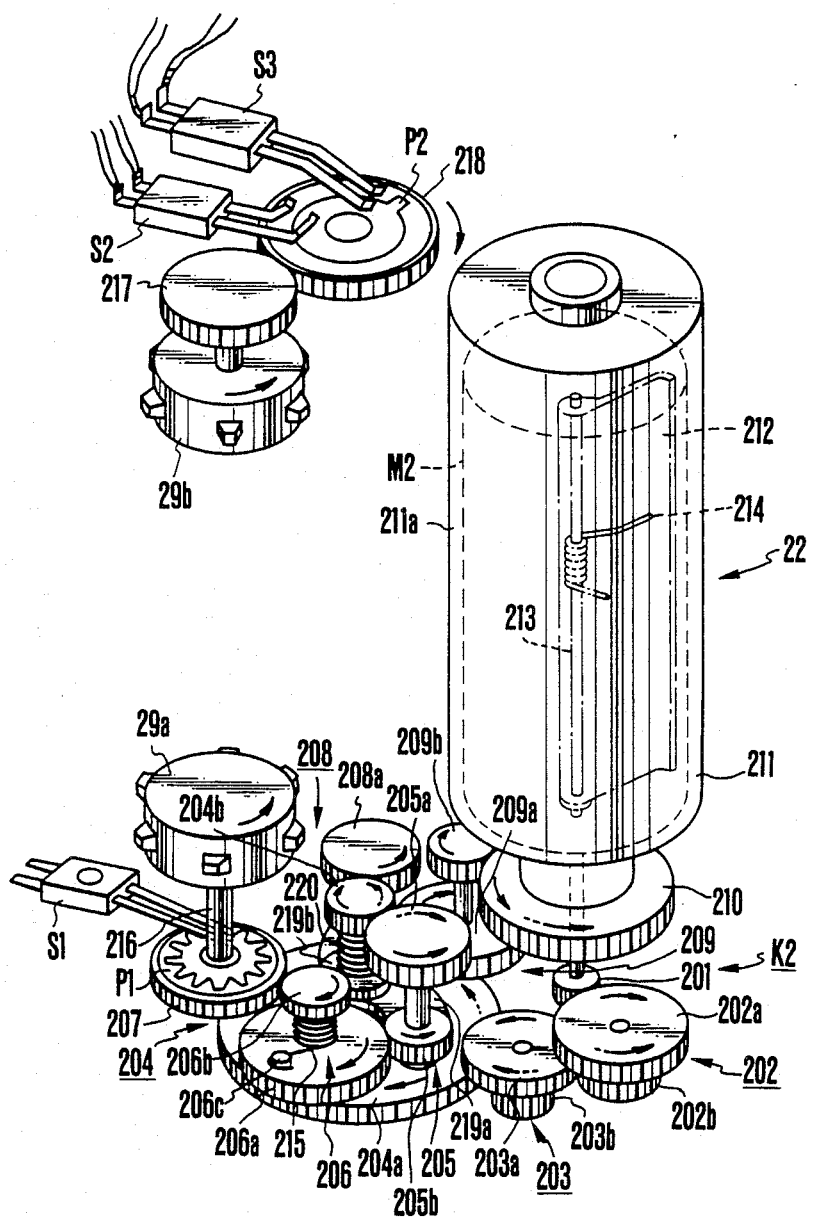
FIG. 5 is a perspective view of the wind-up transmission system.

In FIG. 5, the wind-up transmission system K2 of the wind-up motor M2 is shown in detail. A pinion 201 on the output shaft of the motor M2 mounted within the spool arrangement 22 operating as a film winding operation control mechanism meshes with a 2-stage gear 202 at a large one thereof. Another 2-stage gear 203 meshes with the first one in between the large and small gears 203a and 202b. A third 2-stage gear 204 meshes with the second one in between the large and small gears 204a and 203b. On a shaft between the large and small gears 204a and 204b is pivotally mounted a planetary lever 219a through a bearing 219b. A compression spring 220 between the small gear 204b and the bearing 219b urges the latter in frictional contact on the large gear 204a. This frictional contact causes the planetary lever 219a to turn in either direction depending on the direction of rotation of the gear 204. The planetary lever 219a has two arms on which fourth and fifth 2-stage gears 205 and 208 are rotatably mounted. Positioned adjacent the fourth 2-stage gear 205 is a sixth 2-stage gear 206 whose large and small gears 206a and 206b are rotatable relative to each other but imparted with a one-way clutching function by a coil spring 215 therebetween. Since one end of the coil spring 215 is fixedly secured to a boss 206c on the upper surface of the large gear 206a, as it rotates in a clockwise direction, the coil spring 215 and the coaxial portion of the small gear 206b are constrained to rotate in unison. A gear 207 meshes always with the small gear 206b and is drivingly connected to a sprocket 29a through a shaft 216. A pulse forming disc P1 whose entire circumference is divided into 12 equal parts is fixedly mounted on the upper surface of the gear 207 and cooperates with a pair of probes of a switch S1. So when the sprocket 29a rotates one revolution, the switch S1 produces twelve pulses. With 6 teeth on the drive sprocket 29a, as the camera of 35 mm full size advances the film by one frame for four thirds of its revolution, therefore, the number of pulses produced from the switch S1 is sixteen for each cycle of film winding operation. Needless to say, it is also possible to use a desired number of equal parts of the pulse disc P1.

If the duty drive method is employed for controlling the speed of rotation of the wind-up motor M2, it is preferred to increase the number of equal parts.

A seventh 2-stage gear 209 is positioned adjacent the sixth one 208 and its small gear 209b meshes always with a spool gear 210 which is fixedly mounted to the bottom of a spool 211 of the spool arrangement 22. A rubber tube of thin thickness 211a covers the entire area of that portion of the circumferential surface of the spool 211 which receives film to facilitate automatic snatching up of the film leader. A film pressor plate 212 is positioned adjacent the outside of the spool 211 and pivotally mounted on a shaft 213. A spring 214 urges the plate 212 toward the spool 211. This film pressing means facilitates automatic convolution of the film on the spool 211. Though only one pressor is shown, another one is used on the opposite side.

Another sprocket 29b is driven to rotate by the moving film only. Its rotation is transmitted to a gear 217 through a common shaft and further therefrom to another gear 218 constituting part of a detector. The ratio of the number of teeth of the gear 217 to that of the gear 218 is predetermined to be 3:4. A pulse disc P2 is fixedly mounted on the upper surface of the gear 218, constituting part of each of switches S2 and S3 which produce one pulse for one revolution of the gear 218. The switches S2 and S3 are so arranged that the former is closed earlier than the latter by a time for a prescribed phase of rotation of the pulse disc P2. The pulse from the switch S2 changes the driving mode of the wind-up motor M2 to the duty drive, thereby the motor M2 is decelerated. For, as the switch S3 produces the pulse in that time, the motor M2 rapidly stops when it has been braked.

To control the wind-up motor M1 in such a manner is to advance the film by one frame of the 35 mm full size. As a matter of course, if the tooth ratio of the gears 217 and 218 is changed to 3:2, or if, with the tooth ratio left unchanged from 3:4, the pulse disc P2 is divided to two equal parts so that for every one half of revolution, one pulse is obtained, the film will be advanced by half size for each shot. If, in this case, two pulses are used to form one cycle of operation of the motor M2, it will also be possible to bring the advanced length of film back to the full size. Further, if the acceptable number of pulses is made to change over between one and two for every one shot, the camera will get a capability of operating with selection of the full and half sizes of the frame.

The driving torque of the motor M2 transmits as follows: When the motor M2 rotates in a counterclockwise direction, as all the parts rotate in respective directions indicated by solid line arrows, the gear 204 is rotated in a clockwise direction, thereby the planetary lever 219a is turned in the same direction to bring the small gear 205b into meshing engagement with the large gear 206a and to bring the small gear of the gear 208 into meshing engagement with the large gear 209a. Thus, a large speed reduction is established: Pinion gear 201→gear 202 (large gear 202a, small gear 202b)→the gear 203 (large gear 203a, small gear 203b)→the gear 204 (large gear 204a, small gear 204b) →the gear 205 (large gear 205a, small gear 205b)→the gear 206 (large gear 206a, small gear 206b)→the gear 207 →the drive sprocket 29a. Another large speed reduction is also established: The gear 204 (large gear 204a, small gear 204b)→the gear 208 (large gear 208a, small gear 208b) →the gear 209 (large gear 209a, small gear 209b)→the spool gear 210→the spool arrangement 22.

Conversely when the wind-up motor M2 rotates in a clockwise direction, as all the parts rotates in respective directions indicated by dashed line arrows, the gear 204 is rotated in the counterclockwise direction, thereby the planetary lever 219a is turned in the counterclockwise direction to bring the large gear 205a into meshing engagement with the spool gear 210 directly. Thus, a small speed reduction is established: The pinion gear 201→the gear 202 (large gear 202a, small gear 202b)→the gear 203 (large gear 203a, small gear 203b)→the gear 204 (large gear 204a, small gear 204b)→the large gear 205a→the spool gear 210. In this mode, however, the transmission to the drive sprocket 29a is cut off, and the drive sprocket 29a becomes freely rotatable.

Thus, the two transmissions between the wind-up motor M2 and the spool arrangement 22 are selectively operated depending upon the direction of rotation of the motor M2. Specifically speaking, when in the counterclockwise direction, the spool arrangement 22 rotates at a low speed, while when in the clockwise direction, it rotates at a high speed. It is to be noted here that in either case, the direction of rotation of the spool arrangement 22 is always counterclockwise.

It should be pointed out that the choice of the counterclockwise rotation of the wind-up motor M2 is exercised only when the camera is set to an automatic film loading mode. Because the high speed reduction of the wind-up transmission system K2 operates, the sprocket 29a is driven to rotate, pulling the film out of the cartridge, while the fed portion of the film is taken up on the rotating spool arrangement 22. In the subsequent or one-frame-at-a-time or continuous run mode, by the clockwise rotation of the motor, the system K2 is switched to the low speed reduction, driving the spool arrangement 22 only to rotate at a high speed. Of course, the wind mode may otherwise be operated by the counterclockwise rotation of the motor M2. Even if so, no slack loop of film between the drive sprocket 29a and the spool arrangement 22 is formed, because the peripheral speed of the spool arrangement 22 is formed, because the peripheral speed of the spool arrangement 22 is previously adjusted to be faster than that of the drive sprocket 29a. In other words, the sprocket 29a functions as a drive source for the film only when the film is not pulled by the spool arrangement 22. For the other time, it acts merely as an idler.

Figure 6:
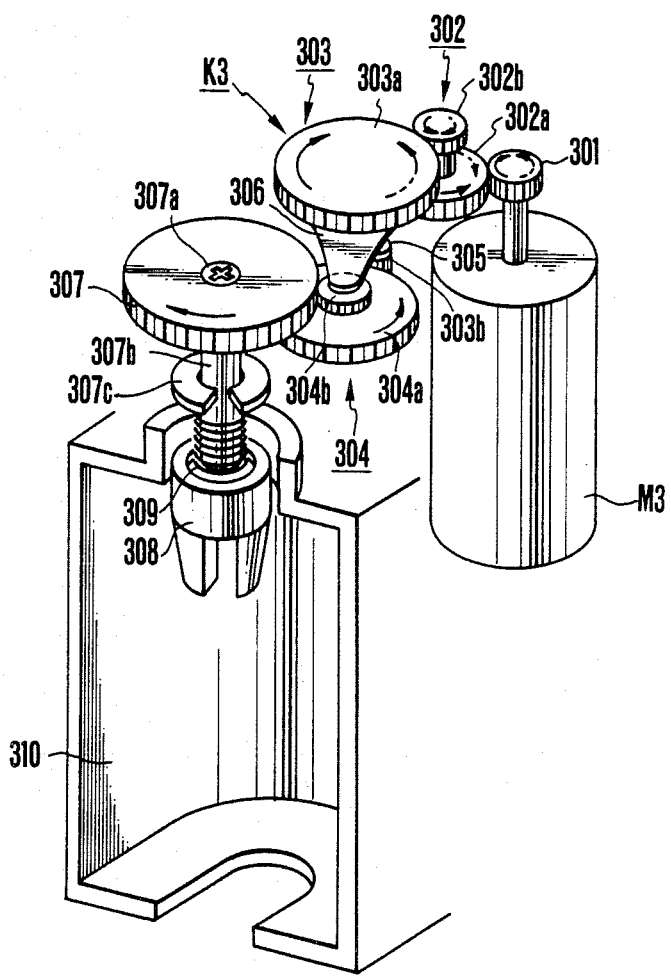
FIG. 6 is a perspective view of the rewind transmission system.

In FIG. 6, a rewind transmission system K3 of the rewind motor M3 is shown in detail. A pinion gear 301 on the output shaft of the rewind motor M3 meshes with a large gear 302a of a 2-stage gear 302 whose small gear 302b meshes with a large gear 303a of another 2-stage gear 303. A planetary lever 306 is pivotally mounted on a common shaft of the gear 303. A compression spring 305 between the small gear 303b and the planetary lever 306 urges the latter in frictional contact with the large gear 303a. By this frictional contact, the planetary lever 306 is caused to follow up the direction of rotation of the gear 303. The free end of the planetary lever 306 rotatably carries a third 2-stage gear 304 having a large gear 304a and a small gear 304b. A gear 307 is fixedly mounted to one end of a shaft 307b by a screw fastener 307a, the opposite end of which movably carries a rewind fork 308 operating as a film rewinding operation control mechanism. The fork 308 projects into a cartridge chamber 310 and is arranged to be engageable with a hub of the film cartridge (not shown). Positioned between a collar 307c on the shaft 307b and the shoulder of the fork 308 is a coil spring 309 to allow the fork 308 to retract from the chamber 310 when the film cartridge is inserted thereto or removed therefrom.

When the rewind motor M3 rotates in a clockwise direction, the gear 303 is rotated in the same direction together with the planetary lever 306, thereby the small gear 304b is brought into meshing engagement with the gear 307. Thus, a driving torque transmission is established: The pinion gear 301→the gear 302 (large gear 302a, small gear 302b)→the gear 303 (large gear 303a, small gear 303b) →the gear 304 (large gear 304a, small gear 304b)→the gear 307→the fork 308. Conversely when the rewind motor M3 rotates in a counterclockwise direction, the planetary lever 306 is turned in the same direction, thereby that transmission is cut off in between the small gear 304b and the gear 307. Hence, for, in the winding mode, the rewind motor M3 and rewinding transmission system K3 do not partake in increasing the load on the winding-up motor M2, a few angles the rewind motor M3 rotates in the counterclockwise direction is sufficient.

Also, since the counterclockwise rotation of the rewind motor M3 does not give any influence on the other drive systems, it is in this embodiment that the rewind motor M3 of counterclockwise rotation is used as a load when to detect whether or not the capacity of the electrical power source is sufficiently present.

Though, in each of the transmission systems K1 to K3 shown in FIGS. 4 to 6, use is made of the planetary gear in changing over between two values in the speed reduction ratio in automatic response to change of the direction of rotation of the motor, it is also possible to use a one-way clutch as such means.

Figure 7:
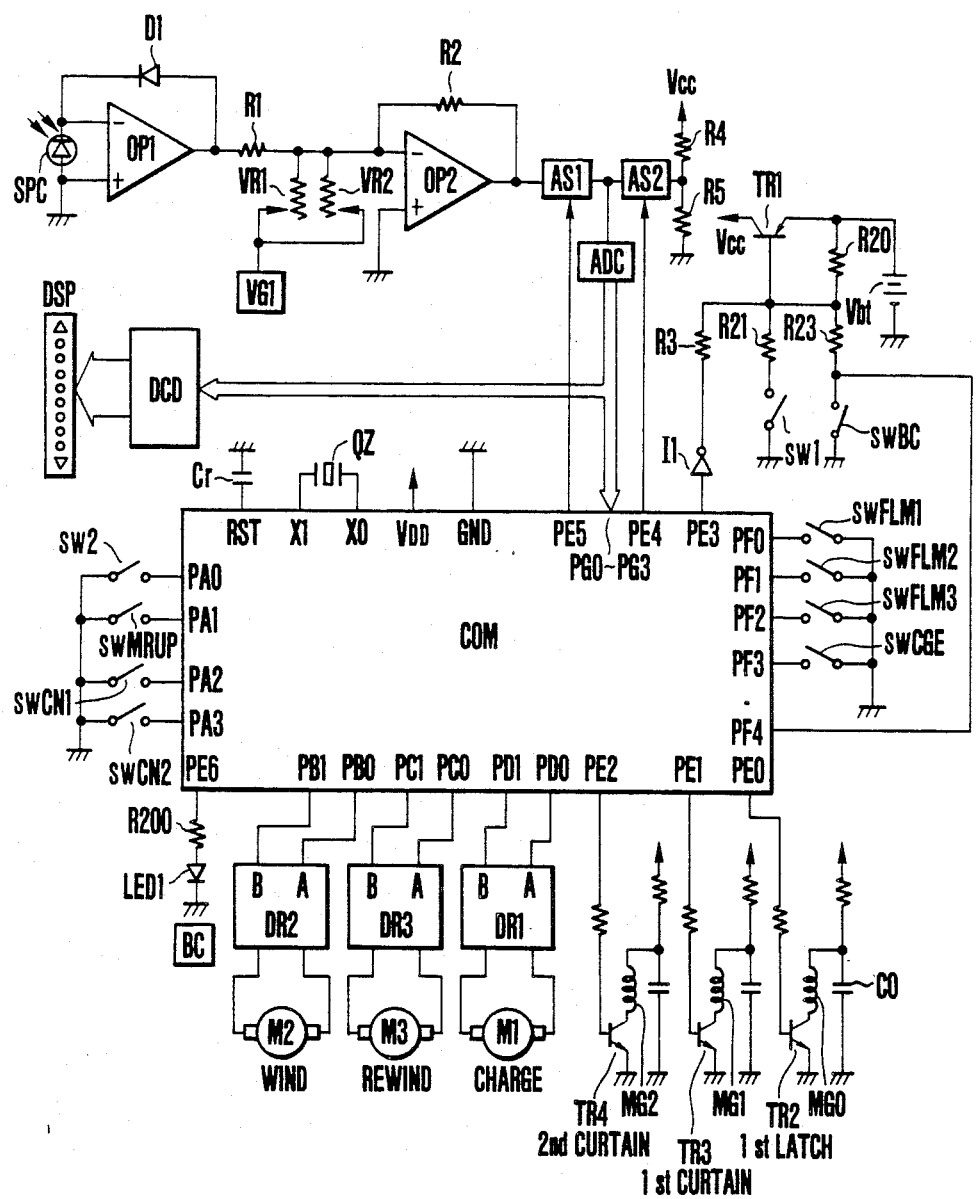
FIG. 7 is an electrical circuit diagram of a micro computer and peripheral circuits.

FIG. 7 illustrates a practical example of the circuitry of the camera in which the control means 1 is made of a microcomputer COM. A silicon photo cell SPC is positioned to receive light from an object to be photographed and is connected between two inputs of an operational amplifier OP1 of high input impedance with a compression diode D1 connected in the feedback loop thereof. The operational amplifier OP1 produces an output signal Bv representing the logarithm of the brightness of the object through a resistor R1. Variable resistors VR1 and VR2 are connected to a constant voltage generator VG1 and produce film sensitivity information Sv and aperture value information Av. Another operational amplifier OP2 having a resistor R2 in the feedback loop thereof computes an exposure value i.e. shutter time information Tv based on the formula: Tv=(Bv+Sv−Av). The shutter time information Tv is converted to a 4-bit digital value by A/D converter ADC and then displayed by a display device DSP within the finder through a decoder driver DCD, and applied to input ports PG0 to PG3 of the microcomputer COM. For note, 4-bit binary coded values [0001] to [1000] correspond to 1/1000 sec. to ⅛ sec. and those [0000] or more represent warning signals in the display.

When a release button is pushed down to a first stroke, a power switch sw1 is closed, thereby a transistor TR1 is turned on to supply electrical power as a voltage Vcc from a battery Vbt to the various portions of the circuitry. Though not given the Vcc-labelled arrow in the drawing, the operational amplifiers and the A/D converter, for example, are of course supplied with the electrical power. Even after the switch sw1 is opened, the power supply is sustained so long as an output port PE3 of the microcomputer COM produces a signal of low level which is applied through an inverter I1 and a resistor R3 to the base of the transistor TR1.

The microcomputer COM has a terminal RST connected to a capacitor Cr at one pole with the opposite grounded, terminals X0 and X1 between which is connected a quartz oscillator QZ, another terminal VDD connected to the voltage source Vcc, and another terminal GND grounded.

Its input ports PA0 to PA3 are respectively connected to a release switch sw2 arranged to turn on when the release button is pushed down to a second stroke, a mirror-up sensing switch swMRUP arranged upon mirror-up to turn off and upon mirror-down to turn on, a shutter opening sensor or switch swCN1 arranged to turn off or on when the leading curtain of the shutter has run down or charged respectively, and a shutter closing sensor or switch swCN2 arranged to turn off or on when the trailing curtain of the shutter has run down or charged respectively.

Another input ports PF0 to PF4 are respectively connected to a first film switch swFLM1 comprising the pulse disc P1 and the pair of contacts S1 (FIG. 5), a second film switch swFLM2 comprising the pulse disc P2 and the pair of contacts S2 (FIG. 5), a third film switch swFLM3 comprising the pulse disc P2 and the pair of contacts S3 (FIG. 5), a charge switch swCGE comprising the signal disc on the cam gear 109 (FIG. 4) and the pair of contacts S0 and arranged to turn on when the charging operation is completed, and a battery check switch swBC.

Its output ports PE0 to PE2 are connected to the bases of transistors TR2 to TR4 respectively controlling the current supply to a permanent magnet-equipped solenoid MG0 of the first latch for beginning a mechanical release operation, a leading curtain release solenoid MG1 and a trailing curtain release solenoid MG2.

The output port PE3 is connected to the base of a transistor TR1 through an inverter I1 and a resistor R3.

The emitter of the transistor TR1 is connected to the electrical power source or battery Vbt. A switch sw1 is arranged to be turned on when a shutter release button (not shown) is pushed down to the first stroke. R23 is a resistor.

The output ports PE4 and PE5 are connected to analog switches AS1 and AS2 respectively. Here, when the analog switch AS1 is in the conducting state by the signal from the output port PE5, it is in an A/D converter ADC that a signal corresponding to the output of the photosensitive element SPC is converted to a digital value. Also, when the analog switch AS2 is in the conducting state by the signal from the output port PE4, it is the voltage Vcc of the electrical power source divided by the resistors R4 and R5 that is A/D-converted by the A/D converter ADC.

The output port PE6 is connected through a resistor R200 to a light-emitting diode LED1 for indicating that the battery voltage is not sufficient.

Another output ports PB0 and PB1 are connected to a drive circuit DR2 for the wind-up motor M2. Another output ports PC0 and PC1 are connected to a drive circuit DR3 for the rewind motor M3. Another output ports PD0 and PD1 are connected to a drive circuit DR1 for the charge motor M1.

Figure 8:
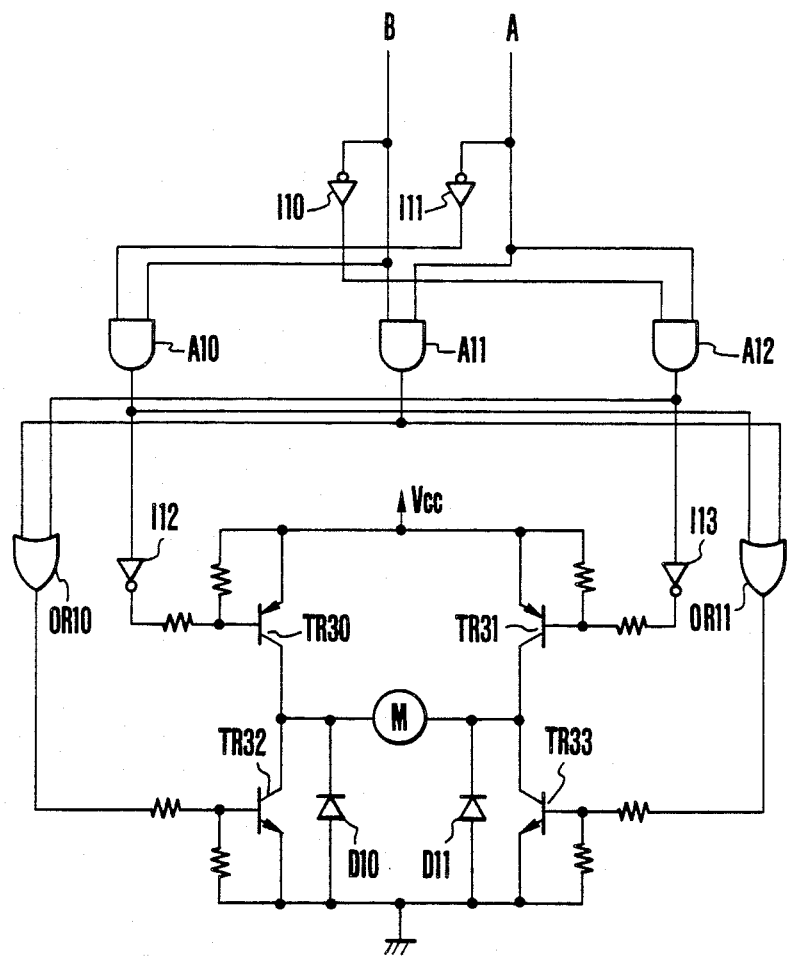
FIG. 8 is an electrical circuit diagram of the drive circuit.

FIG. 8 illustrates the details of each of the drive circuits DR1 to DR3, where two input terminals A and B receive a 2-bit signal. At first, for A=1, B=0, because the input B is inverted by an inverter I10, the output of an AND gate A12 is "1", and the output of OR gate OR10 is also "1", thereby a transistor TR32 is turned on. Also because the output of an inverter I13 is "0", a transistor TR31 also is turned on. Therefore, the voltage Vcc of the battery is applied across the motor M with current flowing in such a direction that the motor M rotates in a normal direction.

To A=0, B=1, because the input A is inverted by an inverter I11, the output of an AND gate A10 becomes "1", the output of an OR gate OR11 also becomes "1", and the output of an inverter I12 becomes "0", thereby transistors TR30 and TR33 are turned on. As current flows to the motor M in the reverse direction, the motor M rotates in the reversed direction.

For A=1, B=1, the output of an AND gate A11 is "1". Therefore, the outputs of the OR gates OR10 and OR11 take "1" simultaneously, turning on the transistors TR32 and TR33. Hence, if this signal appears at a time during the rotation of the motor M, not only the current supply to the motor is cut off no matter which direction of rotation of the motor M may be by diodes D10 and D11 and the transistors TR32 and TR33, but also the winding of the motor M is short-circuited to brake the motor M against the further rotation by inertia.

When A=0, B=0, all the outputs of the AND gates A10 to A12 have "0", causing the transistors TR30 to TR33 all to turn off, so that the motor M is in open state.

Figure 10:
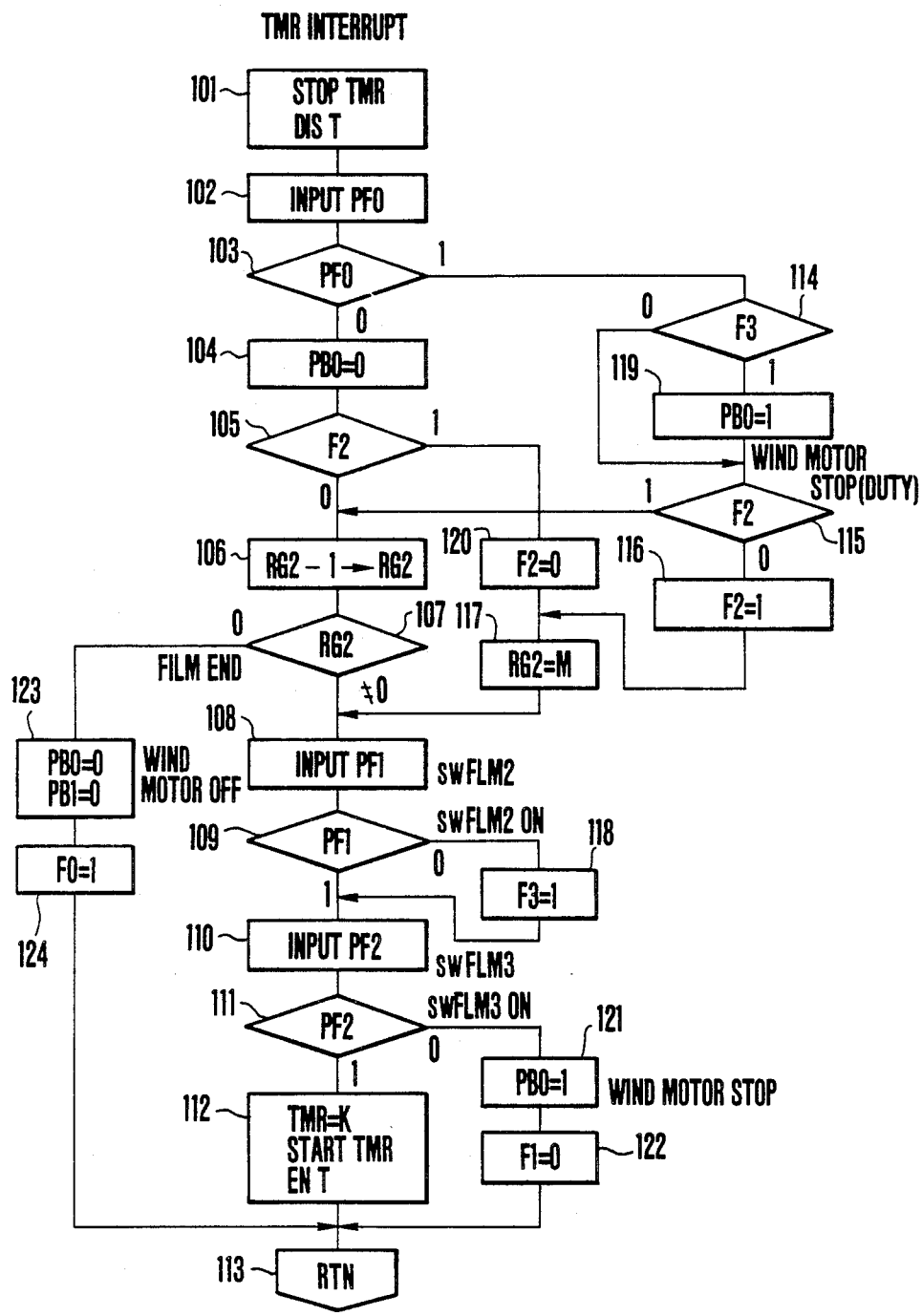

The operation of the microcomputer COM is next explained in detail by reference to the flow chart of FIGS. 9A, 9B and 10.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step 2-1: Receive the input from the input port PA3 (hereinafter called PA3 input, and this also applies to the other ports). The trailing curtain switch swCN2, as has been described above, turns off when the trailing curtain has run down, and on when the charging is completed.

Step 2-2: If PA3 input is "1", or the charging is not completed yet, jump to step 2-3. If the charging is in completion, advance to step 2-5.

Step 2-3: Change PE3 output to "1". That is, by changing PE3 output to "1", the transistor TR1 is turned on through the inverter I1, regardless of the state of the switch sw1.

Step 2-4: Jump to step 200 to be described later. The advance of the program to such a step implies that the voltage of the electrical power source falls so low that the film wind-up motor and the charge motor cannot be driven.

The reason is that if the voltage of the electrical power source is sufficiently present, even when the film is tensioned to stop the film wind-up motor, the termination of the film exposure allows the charging to be completed by the charge motor, and results in the closure of the switch swCN2.

Step 2-5: Change the output port PE6 to "0". Since, at the time of power-on-reset, all the output ports are "0" in the initial stage, this command has no meaning. But, when the battery check warning indicator LED1 is lighting on by the command of PE6=1 as will be described later, this command lights off the indicator LED1. The light of the indicator LED1 presents a display of "BC" with the help of a mask provided adjacent thereto, warning the photographer that the battery voltage has dropped.

Next, the program advances to step 2-6.

Step 2-6: Receive PA3 input. If the various portions have all been charged, when the photographer pushes the release button to the second stroke, then PA0=PA1=PA2=PA3=0. Therefore, PA input has a value of "00H" in the hexadecimal system.

Step 3: If PA input is "00H", advance to step 5. If not, advance to step 4.

Step 4: Now assuming that PA input is not "00H", change PE3 output to "0". Since, at the time of the power-on-reset, all the outputs are "0", this command is meaningless. But, because there is a case where the program jumps to step 1 on the way, it is at this time that it gets a meaning. (Latch release of the battery voltage Vcc).

Step 5-1: When PA input is "00H", or when the photographer pushes the release button to the second stroke, enter the exposure mode. PE3 output becomes "1", sustaining ON of the transistor TR1 to latch the battery voltage Vcc.

Step 5-2: Turn on the analog switch AS1, and off the analog switch AS2, thereby the output of the operational amplifier OP2, or the output of the photosensitive element SPC is A/D-converted.

Step 6: The APEX value Tv of shutter time in the form of a 4-bit digital value from the A/D converter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control selenoid MG0. Thereby, a mechanical release operation, for example, stopping down the mounted lens and raising the mirror, is actuated.

Step 9: The flow is waited for a certain time by a timer. A program for this purpose is, for example, to put a certain value into the accumulator A, and then subtract one by one from that value until A=0. The time necessary to do this may be used as the waiting time. The program procedure is not shown because the flow chart would become very complicated. For note, TIME2 to TIME4 have similar programs.

Step 10: The PE0 output is then changed to "0", thereby the current supply to the first latch control selenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position. When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not Rg1>8, or the shutter time is longer than ⅛ sec., is examined.

Step 18: If RG1>8, it is forced to RG1=8, or the shutter time is fixed to ⅛ sec.

Step 19: The accumulator A is incremented by "1". Routines in steps 19 to 22 are to convert the value of the internal register RG1 representing the shutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with current. The trailing curtain runs down, terminating the operation of the focal plane shutter.

Step 29: A time necessary for the trailing curtain to travel across the film gate is formed by a constant time timer.

Step 30: Reset to PE1=PE2=0. So the leading and trailing curtain control solenoids MG1 and MG2 are deenergized.

Step 31: An input from the trailing curtain sensor switch swCN2 is taken up.

Step 32: A routine for waiting for closure of the trailing curtain switch swCN2, or the completion of running down of the trailing curtain. When the running down completes, advance to step 200.

It was customary that the completion of running down of the trailing curtain of the shutter was followed directly by the winding up of the film. But, here whether or not the capacity of the electrical power source is present sufficiently for carrying out the film winding up is detected by steps 200 to 206 shown below.

Step 200: Change PE4 output to "1", and PE5 output to "0".

The analog switches AS1 and AS2 shown in FIG. 7 are turned on and off respectively.

Therefore, the A/D converter ADC converts the voltage obtained by dividing the battery voltage Vcc by the resistors R4 and R5 to a digital value.

Step 201: Change PC0 output to "1", and PC1 output to "0". The rewind motor M3 is caused to rotate in the reversed direction to that when in the rewind mode.

Upon the reversed rotation, as has been described in FIG. 6, the gear system for rewinding is cut off from the gear system of the motor shaft. Thus, under a condition of almost no load, the motor rotates in the reverse direction.

Step 202: TIME5. Wait for a time.

Step 203: INPUT PG0 to PG3. AD conversion outputs are entered in the accumulator A. Here, a heavy load due to the rush current by the initial current supply to the rewind motor (a current almost proportional to the coil resistance of the motor flows to the motor) is laid on the battery. The above-described step 202 is to wait time until the rush current rises and becomes sufficiently large. To read the battery voltage sensed at this time in the micro computer COM is this command.

Step 204: Change PC0 output to "0". Stop the rewind motor.

Step 205: Since the digital value corresponding to the battery voltage has been read in the accumulator A, that value is discriminated. If here such digital value is a higher voltage than the constant K1, advance to step 33 where the ordinary charge is carried out. If it is a lower voltage than the constant K1, advance to step 206. For note, the constant K1 is set to a critical value for discriminating whether or not the battery has a sufficient voltage for carrying out the film winding and charging by one frame.

Step 206: Output "1" at the output port PE6. Thereby the indicator LED1 is lighted on, warning the result of the battery check.

Next, the program returns to the start.

Therefore, when the switch sw1 is left pushed down, because the switch swCN2 remains OFF, the flow repeats the loop of the steps 2-1, 2-2, 2-3, 2-4, 200-206 returning to step 1, warning by the indicator LED1 that the battery is inferior, and prohibiting the film drive and charge from being carried out. Either when the battery comes to recover, or when it is replaced by a new one, the flow advances from the step 205 to the step 33, allowing the ordinary winding up operation to proceed.

Step 33: PD0=0, PD1=1 render the drive circuit DR1 operative. The charge motor M1 starts to rotate. Thereby, the shutter, mirror and automatic diaphragm are charged.

Step 34: Wait for a time from the start of current supply to the charge motor M1 to start energization of the wind-up motor M2, until the current flowing through the winding of the charge motor M1 becomes stable. Thereby, the rush currents in the initial stages of operation of the motors M1 and M2 are prevented from superimposing one upon another.

Step 35: PB0=0, PB1=1 render the drive circuit DR2 operative. The motor M2 starts to rotate. Thereby the film is wound up.

Step 36: Set a constant K in a timer TMR for timer interruption. K is taken at a value depending on the winding-up speed of the film, the number of equally divided parts of the pulse disc P1 (FIG. 5) of the first film switch swFLM1, and the period of instruction cycle of the micro-computer COM.

Step 37: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 10.

Timer Interruption Procedure:

Step 101: Prohibit decrement and interruption of timer TMR.

Step 102: Input PF0 from the first film switch swFLM1.

Step 103: If PF0=0, advance to step 104. If PF0=1, jump to step 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from the third film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled.

Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0 which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=1, which represents the film end.

The above-described loop beginning with the step 37 of the main routine is executed always until the next shot goes to step 15. Thus, the film winding operation is controlled accurately.

We now proceed to explain the remain of the main program routine.

Step 38: Input a signal representing that the shutter, mirror and automatic diaphragm have been charged from the charge switch swCGE.

Step 39: A routine comprised together with step 38 for waiting until the charging is completed. Of course, during this time, a necessary number of cycles of timer interruption procedure are carried out.

Step 40: Change PD0 output to 1, causing the charge motor M1 to be braked.

Step 41: Test the flag F0 which represents the film end. Now suppose the film is not all exposed, then advance to step 42.

Step 42: Similar to step 2-1.

Step 43: If the photographer continues pushing the release button with intention of shooting in the continuous run mode, the second-stroke dependent switch sw2 remains ON, so that the PA inputs have a hexadecimal number of [00H], causing a jump back to step 5-2: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firing rate of shots is increased. After that, the termination of upward movement of the mirror is determined in step 12, and the termination of the film winding operation is determined in step 14. Until now, the timer interruption is repeated any number of times. Upon detection of the termination of the film winding operation, advance to the next step for shutter control.

Next explanation is given to the single frame shooting mode. Since after each shot, the photographer must have continued pushing the release button in the second stroke, step 43 is followd by step 44.

Step 44: Test the completion of the winding by the timer interruption procedure, or F1=0. If not, repeat steps 41 to 44. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure:

When the film is tensioned at an intermediate point during the winding operation, the execution of the timer interruption subroutine results in F0=1, causing the flow to be branched from step 41 to step 45.

Steps 45-47: Energize solenoid MG2 for a certain time, causing the trailing curtain to run down as in steps 28 to 30. This is because the film is protected against fogging when it happens that the photographer while having carelessly taken the lens off the camera body and been exposing the shutter to strong light, carries out the rewinding. Since both of the leading and trailing curtains are present in front of the exposure aperture, even if the shutter blades are deformed by static electricity or wind caused by the film feeding, the strong light can be shut out perfectly from the film surface.

Step 48: Input a signal from the trailing curtain sensing switch swCN2.

Step 49: Wait for the completion of running down of the trailing curtain. Upon completion, then advance to step 50.

Step 50: Set PC0=0, PC1=1, causing the rewind motor M3 to rotate.

Step 51: Set the internal register RG2 to M1.

Steps 52-60: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding. Then advance to step 61.

Step 61: Change to PC0=1, causing the rewind motor M3 to stop.

Step 62: Reset flag F0 to "0" which represents the film end.

Step 63: Set PD0=0, PD1=1, causing energization of the charge motor M1. This is because the trailing curtain ran down in step 45 to prepare for the rewinding, for the shutter mechanism is charged.

Step 64: Input a signal from the charge switch swCGE.

Step 65: Wait for the completion of the charging before an advance to step 66.

Step 66: Stop the motor M1. Thus, the rewind procedure all comes to end. Exit this subroutine.

In connection with the continuous shooting mode, we should consider a particular situation where the charging of the shutter, mirror and automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 67.

Step 67: Change to PD0=0, PD1=1, causing the motor M1 to rotate.

Steps 68-69: Detect the charge end.

Step 70: Change to PD0=1, causing the motor M1 to be braked. Thereupon, the mirror is charged, returning down to the initial position. Then jump back to step 45: RWND, and initialize the rewind procedure.

In the above-described embodiment of the invention, after the film exposure was made and the running down of the trailing curtain of the shutter has completed and just before the film winding up starts, the checking of the voltage of the electrical power source or battery is carried out with a load applied on the battery by making the film rewind motor M3 to rotate in the counterclockwise direction. Next explanation is given about a flow for checking the voltage of the electrical power source or battery manually by using FIG. 11. The flow chart shown in FIG. 11 is inserted in between the step 1 and the step 2-1 of FIG. 9A.

Figure 11:
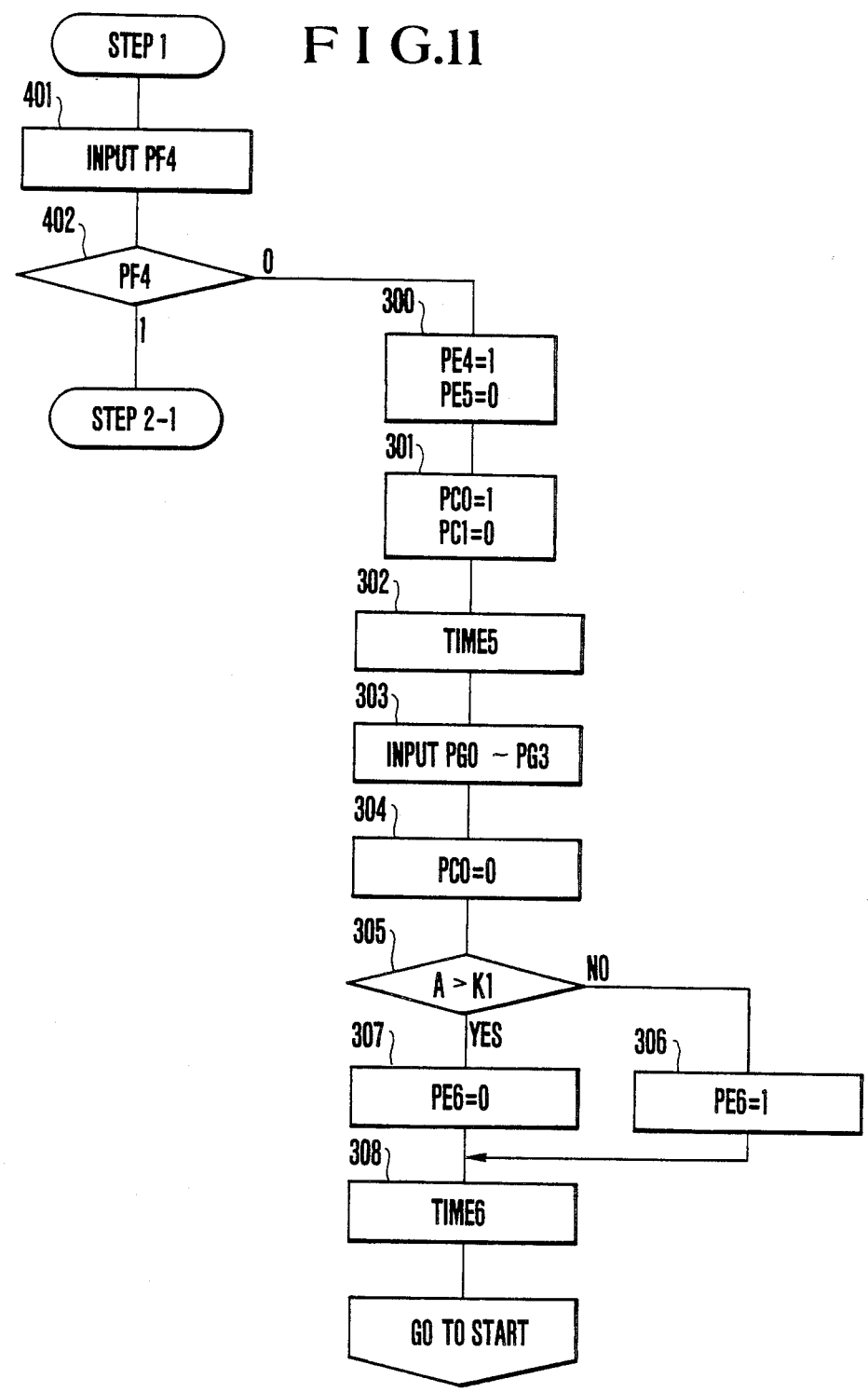

In the following, the flow chart shown in FIG. 11 is explained.

Step 401: Input the signal of the port PF4 in order to sense ON or OFF of the switch swBC for manually checking the battery.

Step 402: A command branched by the signal of the port PF4.

If PF4 is "1", or the switch swBC is OFF, advance to the step 2-1 for the ordinary photographic routine. If the switch swBC is ON, advance to step 300. This is the time of manual battery check.

Steps 300 to 306: Similarly to the steps 200 to 206, the checking of the battery voltage is carried out. If the battery voltage is falling, the indicator LED1 for warning is lighted on.

Step 307: When the battery check is OK, PE6 output is changed to "0", lighting off the indicator LED1.

Step 308: After having counted a prescribed time, for example, 1 second, return to the step 1. Therefore, with the switch swBC maintained ON by pushing down the battery check button (not shown), the battery is checked in each prescribed time of the step 308, turning the indicator LED1 ON or OFF. Thus, the state of the battery can be grasped by the photographer.

For note, the display of the battery check may otherwise be made by lighting on continuously when OK, or intermittently when NG. This can be done by the known techniques.

Though, in the above-described embodiment, as the load for detecting whether or not the capacity of the electrical power source or battery is sufficiently present use is made of the rewind motor M3, another motor may be used. Also in a camera in which the film wind-up motor or charge motor can work when the only of the directions of rotation occurs as is different from the camera described above in which these motors rotate with the selection of the clockwise and counterclockwise directions for changing the film winding speed and the charging speed, that film wind-up motor may be used as the load for detecting whether or not the capacity of the electrical power source or battery is sufficiently present.

Also, in the auto-U-turn, in order to detect whether or not the capacity of the electrical power source or battery is sufficiently present, use is made of the rewind motor M3 as the load with which whether or not the voltage is above a prescribed level is detected. In stead of this, an additional load solely used therefor, for example, a resistor for a load of detecting the capacity of the electrical power source or battery, may be provided.

Also, in the embodiment of the invention, as the performance of the shutter closing operation has been detected, before the film is wound up, the above-described detection of the capacity of the electrical power source is carried out. Its point in time may be any time provided it falls in the interval from after the performance of the shutter closing operation to before the film is wound up.

As has been described above, according to the present invention, only in the case where after it has been detected that the shutter closing operation was carried out and before the film is wound up, the capacity of the electrical power source is sufficiently present for winding up the film by the prescribed amount and the film is not wound up by the prescribed amount, the film rewinding operation is carried out. Therefore, whilst in the prior art, despite the film does not end yet, because the capacity of the electrical power source is insufficient, the automatic rewinding of the film is carried out in response to failure of fully winding up the film, such an accident can be avoided. Also, it can be prevented that even the usable electrical power source is mistaken for being no longer impossible to use.

Further, as the above-described electrical power source voltage detection, the motor usable for winding up the film or charging the shutter and diaphragm of the camera is supplied with current as a load for detecting the electrical power source voltage. Therefore, there is no need to provide a load solely used therefor in the interior of the camera, and a larger load than when the magnet for performing the photographic operation of the interior of the camera can be given to the electrical power source or battery. Therefore, whether or not the capacity of the electrical power source or battery is sufficiently present can be detected more accurately.

What is claimed is:

1. An electrical power source voltage detecting device for a camera having an operation control mechanism, comprising:
    (a) a motor capable of rotating forward and backward;
    (b) an electrical power source circuit for supplying voltage to said motor so that said motor works;
    (c) a drive transmission system arranged upon said forward rotation to transmit the driving torque of said motor to said operation control mechanism and upon backward rotation to hinder the transmission of the driving torque;
    (d) detecting means for detecting the level of said voltage with the use of said motor as a load when said motor rotates backward; and
    (e) a control circuit for causing the backward operation of said motor by said electrical power source circuit and the operation of said detecting means.

2. A device according to claim 1, wherein said operation control mechanism is a mechanism for rewinding the film.

3. An electrical power source detection device for a camera having an operation control mechanism, comprising:
    (a) a motor for driving said operation control mechanism;
    (b) an electrical power source circuit for supplying a voltage to said motor so that said motor is driven to move;
    (c) detecting means for detecting whether or not the level of said voltage is above a prescribed voltage level; and
    (d) a control circuit for causing said detecting means to operate with the use of said motor as a load by supplying current to said motor from said electrical power source circuit.

4. A device according to claim 3, wherein said operation control mechanism is a mechanism for rewinding the film.

5. A control means for a camera having an electrical power source circuit for supplying a voltage to wind-up means for winding up film and rewind means for rewinding the film, comprising:
    (a) first detecting means for detecting whether or not said voltage level is above a prescribed voltage level capable of winding up the film by a prescribed amount by said wind-up means before a winding up operation of the film;
    (b) second detecting means for detecting whether or not the film has been wound up normally by the prescribed amount when the film was wound up by said wind-up means; and
    (c) a control circuit responsive to detection of the fact that the voltage level is above said prescribed voltage level by said first detecting means for operating said wind-up means to wind up the film, and responsive to detection of the fact that when in said winding up operation, said normal winding up of the film is not carried out by said second detecting means for causing said film rewind means to perform a film rewinding operation.

6. A means according to claim 5, wherein said wind-up means is a motor for winding up.

7. A means according to claim 5, wherein said rewind means is a motor for rewinding.

8. A means according to claim 5, wherein said second detecting means detects whether or not the film is wound up by one frame.

9. A means according to claim 7, wherein said first detecting means detects the the voltage level with said rewind motor as a load.

* * * * *